(12) United States Patent
Tang et al.

(10) Patent No.: US 6,646,728 B1
(45) Date of Patent: Nov. 11, 2003

(54) CALIBRATING A FOCUSED BEAM OF ENERGY IN A SOLID FREEFORM FABRICATION APPARATUS BY MEASURING THE PROPAGATION CHARACTERISTICS OF THE BEAM

(75) Inventors: Nansheng Tang, Valencia, CA (US); Jouni P. Partanen, Santa Monica, CA (US)

(73) Assignee: 3D Systems, Inc., Valencia, CA (US)

( * ) Notice: Subject to any disclaimer, the term of this patent is extended or adjusted under 35 U.S.C. 154(b) by 137 days.

(21) Appl. No.: 09/901,163

(22) Filed: Jul. 9, 2001

(51) Int. Cl.$^7$ .................................................. G01J 1/00
(52) U.S. Cl. ....................... 356/122; 356/121; 356/123; 425/174.4
(58) Field of Search ................................ 356/121, 122; 425/174.4

(56) References Cited

U.S. PATENT DOCUMENTS

| | | |
|---|---|---|
| 4,575,330 A | 3/1986 | Hull |
| 4,964,735 A | 10/1990 | Sasnett et al. |
| 5,058,988 A | 10/1991 | Spence |
| 5,059,021 A | 10/1991 | Spence et al. |
| 5,064,284 A | 11/1991 | Johnston, Jr. et al. |
| 5,069,527 A | 12/1991 | Johnston, Jr. et al. |
| 5,078,491 A | 1/1992 | Johnston, Jr. |
| 5,100,231 A | 3/1992 | Sasnett et al. |
| 5,104,592 A | 4/1992 | Hull et al. |
| 5,123,734 A | 6/1992 | Spence et al. |
| 5,133,987 A | 7/1992 | Spence et al. |
| 5,182,056 A | 1/1993 | Spence et al. |
| 5,184,307 A | 2/1993 | Hull et al. |
| 5,214,485 A | 5/1993 | Sasnett et al. |
| 5,267,012 A | 11/1993 | Sasnett et al. |
| 5,267,013 A | 11/1993 | Spence |
| 5,321,622 A | 6/1994 | Snead et al. |
| 5,408,311 A | 4/1995 | Suzuki et al. |
| 5,424,538 A | 6/1995 | Yoshino |
| 5,495,328 A | 2/1996 | Spence et al. |
| 5,499,094 A | 3/1996 | Swierczek |
| 5,587,786 A * | 12/1996 | Champagne et al. ....... 356/121 |
| 5,909,274 A | 6/1999 | Stucchi |
| 5,965,079 A | 10/1999 | Manners |
| 5,999,184 A | 12/1999 | Smalley et al. |
| 6,129,884 A | 10/2000 | Beers et al. |
| 6,172,996 B1 | 1/2001 | Partanen et al. |

OTHER PUBLICATIONS

U.S. patent application No. 09/791,346, filed Feb. 23, 2001 by Wu et al.
DataRay Inc., "Optimize Your Lasers & Laser Assemblies," Feb. 28, 2001.
Coherent, Inc., "Coherent Instruments," Jul. 26, 2001.

* cited by examiner

*Primary Examiner*—F. L. Evans
*Assistant Examiner*—Kara Geisel
(74) *Attorney, Agent, or Firm*—James E. Curry

(57) ABSTRACT

The invention relates in general to calibrating a focused beam of energy in a solid freeform fabrication apparatus, and, in particular, to a method of measuring the propagation characteristics of the beam to produce beam propagation data. The beam propagation data can be used to verify that the beam is operating within tolerance, and/or produce a response that can be used to further calibrate the beam. The invention is particularly useful in determining asymmetric conditions in the beam. The beam propagation data is produced in accord with the "$M^2$" standard for characterizing a beam. In one embodiment, the response indicates the beam is unacceptable for use in the apparatus. In another embodiment, the response is provided to calibrate the focal position of the beam. In still another embodiment, the response is provided to an adjustable beam that eliminates the asymmetric condition.

53 Claims, 8 Drawing Sheets

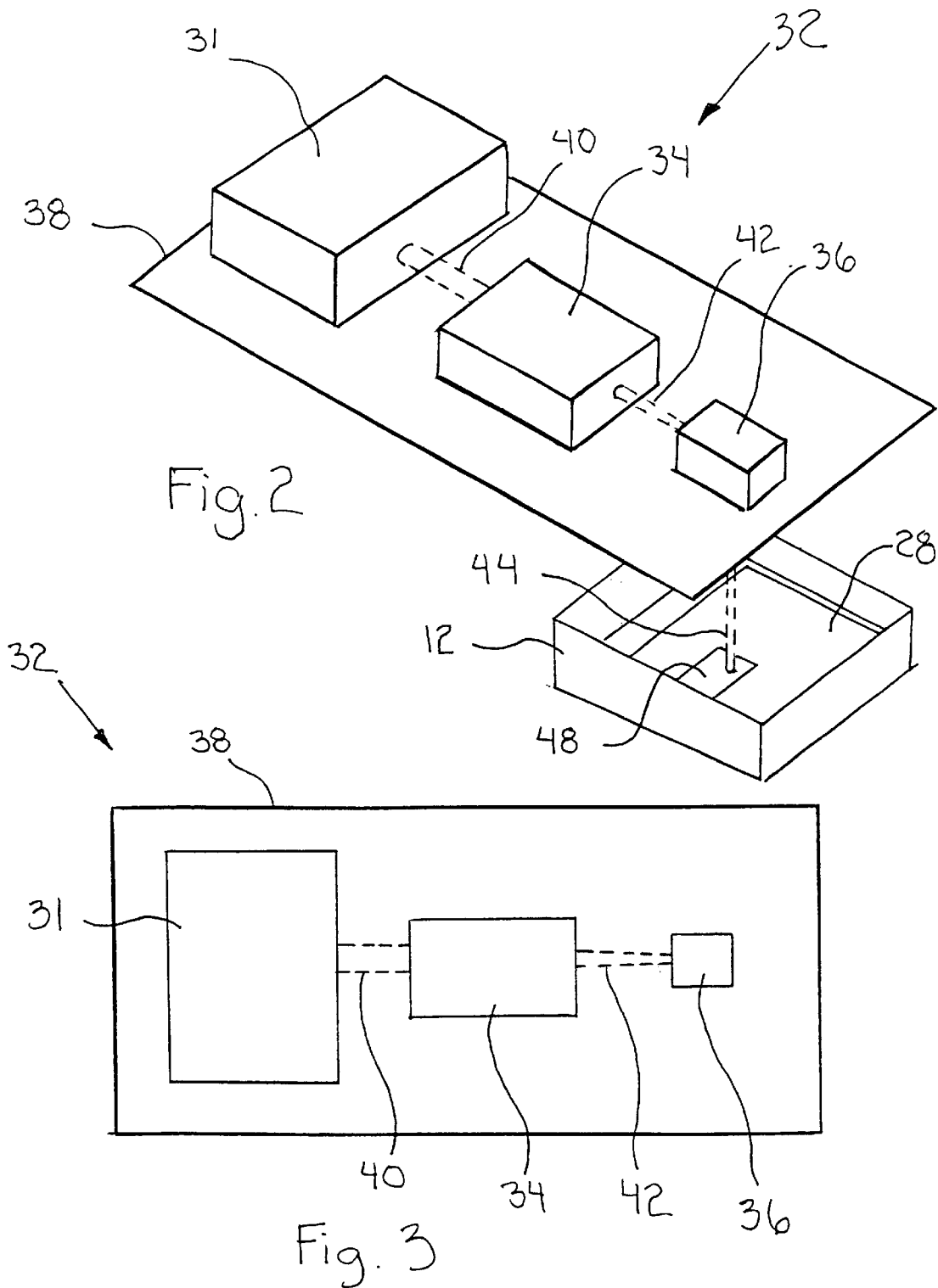

CALIBRATING A FOCUSED BEAM OF ENERGY IN A SOLID FREEFORM FABRICATION APPARATUS BY MEASURING THE PROPAGATION CHARACTERISTICS OF THE BEAM

BACKGROUND OF THE INVENTION

1. Field of the Invention

The invention relates in general to calibrating a focused beam of energy in a solid freeform fabrication apparatus, and, in particular, to a method of measuring the propagation characteristics of the beam to produce beam propagation data. The beam propagation data can be used to verify that the beam is operating within tolerance, an and/or produce a response that can be used to further calibrate the beam. The invention is particularly useful in determining asymmetric conditions in the beam.

2. Description of the Prior Art

Recently, several new technologies have been developed for the rapid creation of models, prototypes, and parts for limited run manufacturing. These new technologies can generally be described as Solid Freeform Fabrication, herein referred to as "SFF." Some SFF techniques include, for example, stereolithography, laminated object manufacturing, selective phase area deposition, multi-phase jet solidification, ballistic particle manufacturing, fused deposition modeling, particle deposition, laser sintering, and the like. In SFF, complex parts are-produced from a build material in an additive fashion as opposed to traditional fabrication techniques, which are generally subtractive in nature. For example, in traditional fabrication techniques material is removed by machining operations or shaped in a die or mold to near net shape and then trimmed. In contrast, additive fabrication techniques incrementally add portions of a build material to targeted locations, layer by layer, in order to build a complex part. Generally, SFF technologies such as stereolithography, selective laser sintering, and the like, utilize a computer graphic representation of a part and a supply of a build material to fabricate a part in successive layers. The build material is typically a powder, liquid, or paste that is solidified, cured, or sintered when stimulated by a focused beam of energy. Normally, the focused beam of energy is selectively scanned across successive layers of the build material to produce a three-dimensional object. Often, the focused beam of energy used is a high powered laser, such as, for example, an Ultra-Violet generating laser used to cure liquid photopolymer materials.

There are many parameters that must be controlled when utilizing a focused beam of energy in an SFF apparatus. For example, the width of the beam and the intensity of the beam are important characteristics that typically must be precisely controlled in order to produce three-dimensional objects of high quality and consistency. In addition, there must be some process or procedure to track the location of the focused beam and or monitor the condition of the beam. Previous expedients in monitoring a beam can be found in, for example, U.S. Pat. No. 5,267,013 to Spence, which discloses an apparatus and method for obtaining the profile intensity of the beam in a stereolithography machine. The apparatus utilizes a sensor comprising a photodetector located behind a pinhole. The photodetector takes measurements of a laser beam as the beam is moved over the sensor, and a beam intensity profile is produced. The profile provides useful information that is indicative of how the beam will cure a photopolymer material, and the information can be used to optimally select various solidification parameters such as cure width, or the like. Undesirably, however, the information is only two-dimensional and does not clearly indicate the true condition of the laser beam. For example, if the beam has an asymmetric condition such as an astigmatism, the two-dimensional data of the profile is insufficient, by itself, to detect the condition, let alone compensate for it.

Until recently there was no agreed upon standard to characterize a beam. However, the "$M^2$" standard for characterizing a beam has recently been adopted by the passing of ISO 11146. As used herein, "to characterize a beam" means to obtain sufficient measurements from the beam to be able to map the three-dimensional propagation characteristics of the beam and/or calculate the values of the beam according to the "$M^2$" standard. The $M^2$ standard, wherein the $M^2$ value is herein referred to as "the times-diffraction-limit number," takes into account the threedimensional nature of a focused beam to quantify the propagation characteristics of the beam. Generally the value of $M^2$ is indicative of how close a beam is to an ideal beam. For example an $M^2$ value of 1.0 indicates an ideal beam. $M^2$ values can be calculated from the following equation:

$$M^2 = (\pi \times 2 \times W_0 \times \Theta (4 \times \lambda)$$

where $W_0$ is minimum waist radius of the beam, $\Theta$ is the divergence angle of the beam, and $\lambda$ is the wavelength of the beam. However, to obtain these values for a real beam, three-dimensional data must be extracted from the beam. Generally, this requires taking three-dimensional measurements of the beam, not just unlinked two-dimensional profiles. In addition, when a focused beam has an asymmetric condition such as astigmatism, $M^2$ values or calculations must be taken or made in two different directions in order to characterize the condition. One instrument capable of making such measurements and calculations is disclosed in, for example, U.S. Pat. No. 5,267,012 to Sasnett et al. The instrument in Sasnett et al. optically transforms the propagation characteristics of the focused beam prior to taking measurements in the transformed state. The measurements are then processed via extrapolation techniques to finally determine the original propagation characteristics of the beam. Thus, the instrument in Sasnett et al. substantially alters the propagation characteristics of the focused beam prior to taking measurements. Such a device could be permanently mounted in an SFF apparatus to measure beam propagation characteristics; however, to do so is undesirable, as it is a relatively complex and expensive component that would not frequently be used. For instance, the need to completely characterize the focused beam in accord with the $M^2$ standard may only arise once or twice, such as during the assembly of the system in order to assure that it will operate within specification. In addition, it would be desirable to be able to perform such measurements on existing SFF equipment that may not be suited to physically receive the diagnostic device disclosed in Sasnett et al. to make the measurements.

Thus, there is a need to develop a method to characterize a focused beam in an SFF apparatus with existing equipment and without adding additional components. There is also a need to completely characterize a focused beam in an SFF apparatus to produce a response indicative of the condition of the beam. There is also a need to provide a simple and effective method to determine whether a focused beam needs to be replaced, or to change the focus point of the beam in order to compensate for an asymmetric condition found in the beam. In addition, there is a need to completely i characterize an adjustable focused beam in an SFF machine in order to eliminate any asymmetric condition detected in the beam. These and other difficulties of the prior art have been overcome according to the present invention.

BRIEF SUMMARY OF THE INVENTION

The present invention provides its benefits across a broad spectrum of SFF technologies. While the description which follows hereinafter is meant to be representative of a number of such applications, it is not exhaustive. As will be understood, the basic apparatus and methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a simple and effective method to determine the propagation characteristics of a beam of energy in an SFF system.

It is another aspect of the present invention to develop a response to the propagation characteristics determined in a beam of energy in an SFF system.

It is a feature of the present invention to develop a response to the propagation is characteristics determined in a beam of energy in an SFF system that lets the operator know if the condition of the beam is acceptable.

It is another feature of the present invention to analyze the propagation characteristics measured in a beam of energy in an SFF system in order to produce a response to compensate for a non-optimal condition detected in the beam.

It is still another feature of the present invention to analyze the propagation characteristics measured in a beam of energy in an SFF system in order to produce a response to eliminate any non-optimal condition detected in the beam such as an out-of-focus condition, an astigmatic condition, an asymmetrical waist condition, an asymmetrical divergence condition, or any combination thereof.

It is an advantage of the present invention that the propagation characteristics of a beam of energy used in an SFF system can be determined without substantially altering the propagation characteristics of the beam when taking profile measurements.

It is another advantage of the present invention that the propagation characteristics of a beam of energy used in an SFF machine can be determined by utilizing existing spot or slit sensors previously used to produce two-dimensional beam profiles.

These and other aspects, features, and advantages are achieved/attained in the solid freeform fabrication apparatus of the present invention that employ a platform, a laser beam generator, beam conditioning optics, scanning optics, a profiling stage, a sensor, and a controller, all of which are in communication with an apparatus structure. The platform supports the build material of a three-dimensional object when IT the object is formed by the SFF apparatus. The laser beam generator produces the energy that is received by the beam conditioning optics. The beam conditioning optics then transmit the energy in the form of the focused beam of energy to the scanning optics which then direct the focused beam towards the platform. The beam conditioning optics establish the propagation characteristics of the beam. In one embodiment, the beam conditioning optics are adjustable to change the focus point of the beam along the propagation axis of the beam. In another embodiment, the beam conditioning optics are also adjustable so as to allow for the complete adjustment of the propagation characteristics of the beam in multiple directions. The scanning optics are used to rotate the focused beam of energy about a reference position so as to selectively direct the focused beam on the build material located above the platform in order to build three-dimensional objects, as desired. The scanning optics are also used to direct the focused beam on the profiling stage, wherein the measurements are taken to measure and calibrate the focused beam of energy. It is preferred that the scanning optics do not substantially alter the propagation characteristics of the focused beam when scanning the beam across the build material or when directing the focused beam at the profile stage.

The profile stage includes at least one sensor for taking at least two measurements indicative of the width of the focused beam at a minimum of three different planar positions that are orthogonal to the propagation axis of the focused beam. The relative distance between each planar position is tracked by any desirable means so that, along with the measurements indicative of the width of the beam, beam propagation data is produced. Preferably two measurements are taken in each planar position, one measurement being taken in a first direction and the other being taken in a second direction. The first and second directions are mutually perpendicular and symmetrically oriented about the propagation axis of the focused beam of energy. The measurements taken in each planar position and the relative distance between each planar position are provided to the controller which processes them to produce the beam propagation data that characterizes the beam. The beam propagation data is then analyzed to detect a non-optimal condition of the beam, in which a response is produced when a non-optimal condition is detected.

In one embodiment, the response indicates to an operator that the non-optimal condition of the focused beam is unacceptable for use in the apparatus, that is, the condition is beyond an acceptable range for the SFF apparatus. In another embodiment, the response is provided to the beam conditioning optics to adjust the focal position of the beam along the propagation axis to an optimized position taking into account the non-optimal condition detected in the beam. In yet another embodiment, the beam propagation data is delivered to a display device such as a monitor or printer to produce a graphic display of the propagation characteristics of the beam. In still yet another embodiment, the response is delivered to the beam conditioning optics of a laterally adjustable beam of energy that is able to eliminate the non-optimal condition measured in the beam. It is envisioned that any combination of the above embodiments can be used and combined, as desired, depending on the application. For instance, it may be desired or convenient to provide the graphic display of the propagation characteristics of the focused beam in every embodiment.

When processing the measurements it is desirable to complete a number of calculations. For instance, in one embodiment the beam waist in the first direction, the beam waist in the second direction, the first focal point value for the beam waist in the first direction, and the second focal point value for the beam waist in the second direction, are determined. In addition, an astigmatism value can be determined by comparing the first focal point value and the second focal point value. Further, a first divergence angle and second divergence angle of the beam can be determined from the measurements taken in the first and second directions respectively. With these values, a first times-diffraction-limit number and a second times-diffraction-limit number ($M^2$ values) can be determined. Preferably, these values are calculated by the controller and displayed graphically on a monitor, as desired.

BRIEF DESCRIPTION OF THE DRAWINGS

The aspects, features and advantages of the present invention will become apparent upon consideration of the following detailed disclosure of the invention, especially when it is taken in conjunction with the accompanying drawings wherein:

FIG. 2 is an isometric schematic view of the optical components of a focused beam of energy used in the present invention.

FIG. 3 is top view of the optical components shown in FIG. 2.

To facilitate understanding, identical reference numerals have been used, where possible, to designate identical elements that are common to the figures.

DETAILED DESCRIPTION OF THE PREFERRED EMBODIMENTS

While the present invention is applicable to all SFF techniques utilizing focused beams of energy, the invention and its embodiments will be described with respect to stereolithography. The stereolithographic system with which the apparatus and method of the preferred embodiment of the present invention is used generates three-dimensional objects by creating a cross-sectional pattern of the object to be formed at a selected surface of a fluid medium. The build material or fluid medium is solidified by the application of impinging radiation beams from a focused beam of energy. Successive adjacent laminae, representing corresponding successive adjacent cross-sections of the object, are automatically formed and integrated together to provide a step-wise lamina or thin layer buildup of the three-dimensional object.

Figure 1:
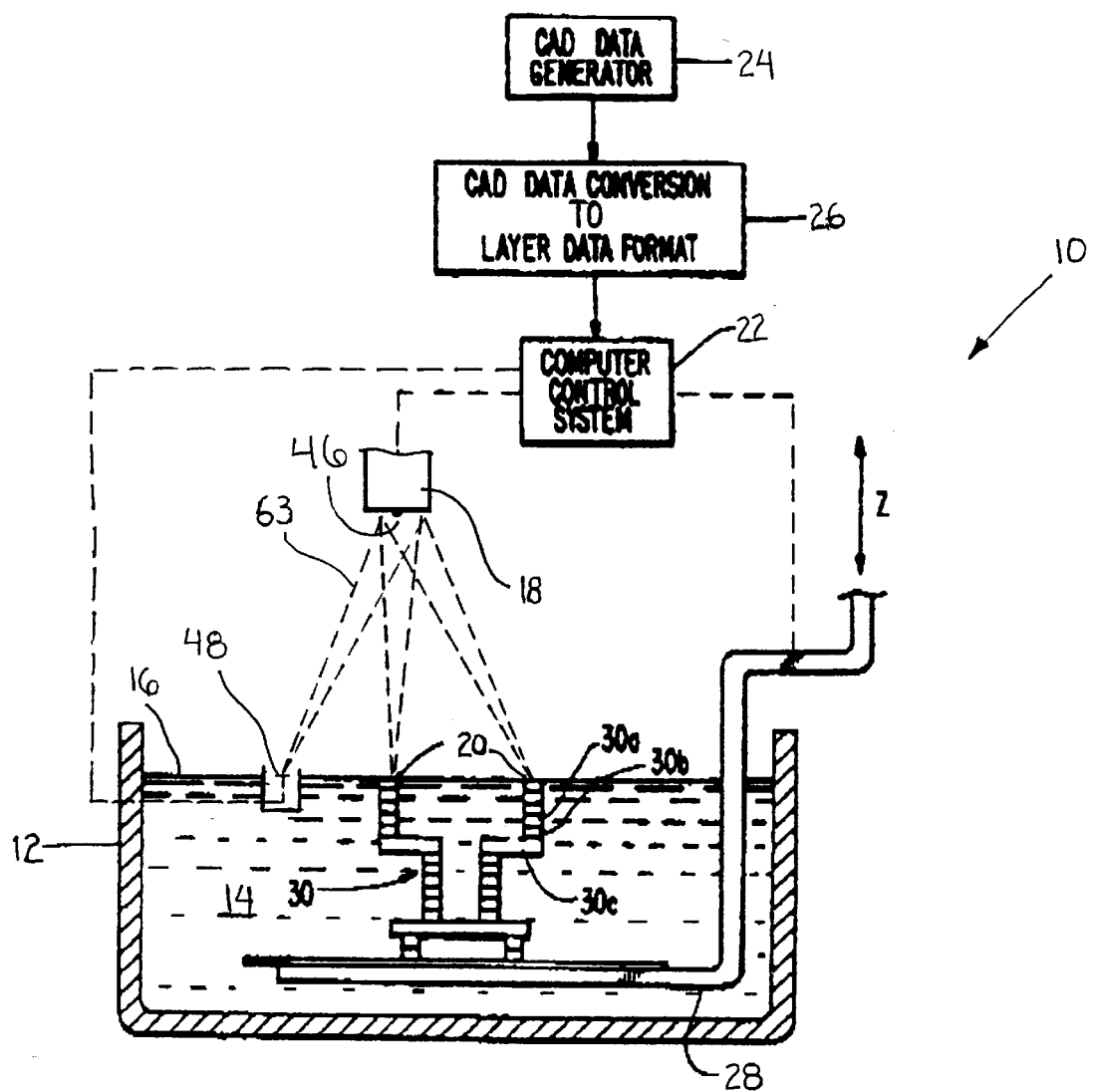
FIG. 1 is a combined block diagram, schematic, and elevational sectional view of a stereolithography system for practicing the present invention.

Referring to FIG. 1, a stereolithographic system is shown generally by the numeral 10. A container 12 is filled with a UV curable liquid 14, having a designated working surface 16. A programmable source of ultraviolet light 18 or the like produces a is spot of ultraviolet light 20 on the plane of surface 16. The spot 20 is movable across the surface 16 by the motion of mirrors or other optical or mechanical elements (not shown in FIG. 1) used in conjunction with the light source 18. The position of the spot 20 on the surface 16 is controlled by a computer control system 22. The system 22 may be under control of CAD data produced by a generator 24, or the like, which is directed in STL file format or its equivalent to a computerized conversion system 26. The computerized conversion system 26 specially processes the data into layer data format. A movable elevator platform 28 inside the container 12 can be moved up and down selectively, the position of the platform being controlled by the system 22. As the system operates, it produces a three-dimensional object 30 by step-wise buildup of integrated laminae such as 30a, 30b, 30c.

The surface of the UV curable liquid 16 is maintained at a constant level in the container 14, and the spot of UV light 20 of sufficient intensity and focus to cure the liquid and convert it to a solid material is moved across the working surface 16 in a programmed manner. Importantly, the shape of the spot of UV light 20 is governed by the propagation characteristics of the focused beam of energy 63. As the liquid build material 14 cures and solid material forms, the elevator platform 28 that was initially just below surface 16 is moved down from the surface in a programmed manner by any suitable actuator. In this way, the solid material that was initially formed is taken below surface 16 and new liquid 14 flows across the surface 16. Preferably a recoating system or mechanism (not shown) applies a new uniform layer of liquid build material over the surface 16. A portion of this new liquid is, in turn, converted to solid material by the programmed UV light spot 20, and the new material solidifies with the material below it. This process is continued until the entire three-dimensional object 30 is A formed. The object 30 is then removed from the container 12, and the apparatus is ready to produce another object. Some suitable stereolithography systems currently available are the SLA® 3500 System and SLA® 7000 System, both manufactured and sold by 3D Systems, Inc. of Valencia, Calif.

The light source 18 for the system according to a preferred embodiment of the invention is an ultraviolet laser generator coupled with beam conditioning optics that produce a focused beam of energy. Helium cadmium lasers have been used, as well as solid state lasers, to generate ultraviolet radiation in the form of a focused beam of energy 63 for the system 10. Generally, the beam conditioning optics comprises spot size control optics for adjusting the lateral extent of the beam, and focus control optics for adjusting the focal position of the beam along the propagation axis of the beam. Typically, the adjustments for spot size control and focus control are not mutually exclusive adjustments, as adjustments made to one may affect the other. Thus, iterative adjustments may be required to eliminate a non-optimal condition detected in a beam. In one embodiment, one degree of freedom of adjustment is provided for the focus control optics, as provided in the beam conditioning optics present in the SLA® 7000 System. Preferably, the laser includes beam conditioning optics that are completely adjustable to eliminate any non-optimal condition detected in the beam. For example, it is preferred to provide two degrees of freedom of adjustment for the spot size control optics and two degrees of freedom to the focus control optics, such as in the laser disclosed in U.S. patent application Ser. No. 09/791,346, filed Feb. 23, 2001, entitled "Electronic Spot Control." As used herein, a "non-optimal condition" of a focused beam of energy is any substantial deviation from that of an ideal beam which has an $M^2$ value of 1.0 that is focused at a desired position. Some exemplary nonoptimal conditions of a focused beam of energy are astigmatic conditions, asymmetrical waist conditions, and asymmetrical divergence conditions. In addition, a non-optimal condition may also be an out of focus condition, wherein the desired focal position of the beam resides outside a desired focal band which typically resides about the working surface 16 of the apparatus. It is to be appreciated that even an ideal beam may exhibit the non-optimal condition of being out of focus. Further, the non-optimal condition may be any combination of these undesirable conditions.

Now referring to FIGS. 2 and 3, a laser system is identified generally by the numeral 32. The laser system is represented schematically by the numeral 18 in FIG. 1. The laser system comprises a laser beam generator 31, beam conditioning optics 34, and scanning optics 36 mounted on apparatus structure 38 which work together to produce a focused beam of energy 44, which is identified by the numeral 63 in FIG. 1. The laser beam generator 31 delivers a beam of energy 40 to the beam conditioning optics 34 which shapes the beam into a focused beam of energy 42 that is delivered to the scanning optics 36 which direct the focused beam towards the resin surface. Preferably the scanning optics merely direct the beam of energy towards the platform without substantially altering the propagation characteristics of the beam. The scanning optics 36 receive instructions from the computer control system 22 for scanning the focused beam of energy along the resin surface shown at 16 in FIG. 1. The focused beam of energy is scanned in a pivotal manner about a fixed reference position 46 (shown in FIG. 1) that resides within the scanning optics 36. The beam conditioning optics 34 include spot size control optics for changing the size of the beam, such as enlarging or reducing the spot size of the beam at the resin surface. The beam conditioning optics 34 also include focus control optics for adjusting the focal position of the beam at the resin surface 16.

Referring to FIGS. 1 and 2, a profiling stage is shown schematically by the numeral 48. In the preferred embodiment two profiling stages are provided (only one shown) that are mounted at the sides of the vat 12 and at a predetermined radial distance from the reference point 46. The predetermined radial distance is indicative of an optimal focal position for beam of energy generated by the laser system. The optimum focal position is typically about 0.3 inches greater than the shortest distance between the reference point 46 and the surface 16 of the resin. Within the profiling stage 48 is a sensor that measures the intensity of the beam to develop a beam profile. The present invention utilizes the intensity measurements of the beam profile to establish measurements indicative of the beam width at the profiling stage 48. The scanning optics or scanning mirror 36 is periodically commanded to direct the laser beam onto the beam profiler sensors, which measure the beam intensity profile and assist in maintaining proper alignment control between the scanning optics and computer control system. Alignment control is needed since the scanning optics selectively pivot the focused beam of energy about the reference point 46 in response to the computer control system to form three-dimensional objects, which could undesirably be built in a drifted layerwise manner if alignment control is not provided. The measurement data of the beam intensity profile may be displayed on the terminal, either as a profile with representation of intensity values, as a single number representing the average beam intensity measured, as a single number representing the beam width, or any combination thereof. The profile information is used to determine whether the mirrors should be cleaned, whether the mirror should be aligned, whether the laser should be serviced, whether the scanner mirrors have drifted, and whether the cure parameter values should be modified to achieve the desired solidification thickness and width. Such use of the profiling stage is disclosed in, for example, U.S. Pat. No. 5,267,013 to Spence.

Figure 7:
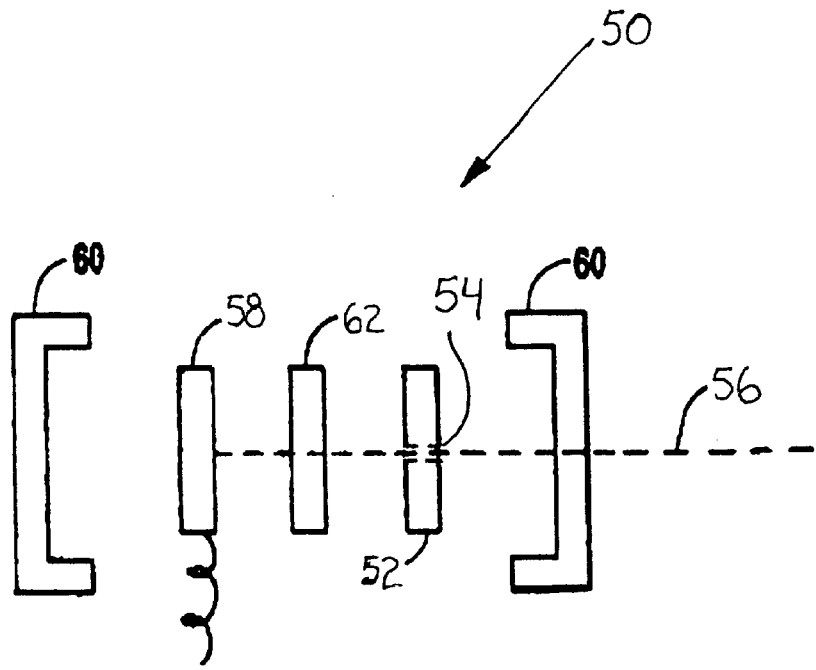
FIG. 7 is a cross-sectional schematic view of a beam profiler sensor of a preferred embodiment of the present invention.
Figure 8:
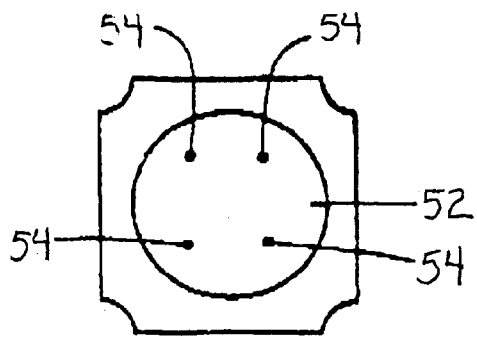
FIG. 8 is a top plan view of a pinhole plate for a beam profiler sensor of a preferred embodiment of the present invention.

Referring to FIGS. 7 and 8, the profiling sensors are shown schematically by the numeral 50. The beam profiling sensor 50 has a thin plate 52 having four pinholes 54 of varying size. In a preferred embodiment these holes have diameters 0.0005", 0.001", 0.002", and 0.004". The pinholes each permit a small fraction of the laser beam 56 incident upon the pinhole to fall on a photodiode sensor 58 underneath the plate 52. The purpose for providing several pinholes is to permit profiling of beams having a wide range of incident power and wide range of spot size; however, one of the pinholes will be best suited for measuring the intensity profile of a beam of a given incident power and given spot size. The beam 56 is scanned across a selected pinhole in an X-Y array to build up a two dimensional profile of the beam intensity. As shown in FIG. 7 the beam profiler sensor 50 has a two-part housing 60 and the light beam 56 enters from the right and moves toward the left. The beam profiling sensor 50 includes an ultraviolet transmitting filter 62 that absorbs visible light and prevents spurious readings due to visible light. The filter 62 is made from a two-millimeter thickness of Schott UG-11 filter glass which has been found to be acceptable for this purpose in a preferred embodiment. The characteristics of this filter provide reasonable transmission of light in the 300–370 nanometer wavelength region with considerably less transmittance at other wavelengths. A one-millimeter thickness of HOYA U-350 filter material could also be used, if desired.

Underneath the filter 62 in the beam profiler housing is a photodiode sensor 58 which detects the ultraviolet light which passes through the filter 62 from the pinhole 54. An EG&G Vactec VTS 3072 super blue enhanced photodiode has been found to be acceptable. The output from this photodiode is passed to a current to voltage amplifier (not shown). An OP07 operational amplifier whose implementation is well known to those skilled in the art has been found to be acceptable.

The pinhole plate 52 of the beam profiler sensor 58 is covered with a quartz plate (not shown). The quartz plate is cleanable and protects the beam profiler sensor from dust and photopolymer drips. The quartz plate should be coated to prevent internal reflections when the photosensor is not perpendicular to the beam in order to prevent false shape measurements. Optionally, a diffuser (not shown) can be used between the pinholes to aid the filter to protect the optical components from damage by intense UV beams.

Referring back to FIG. 1, the control and analysis computer 22 is fundamental to the execution of the steps of the present invention. This controller receives input from a program, a keyboard or the like, and may display the results graphically on a monitor, or output the results to a printer, if desired. The control and analysis computer 22 sends positioning commands to the scanning optics 36 (shown in FIGS. 2 and 3) which controls the X-Y scanner mirrors within the scanning optics. The laser beam is focused by the beam conditioning optics 34 (shown in FIG. 2) before reaching the X-Y scanner mirrors of the scanning optics 36, and is then directed by those mirrors to one of the beam profiler sensors. The use of two beam profiler sensors is recommended for the purpose of drift correction, as discussed in U.S. Pat. No. 5,267,013 to Spence. The sensor signals taken by the beam profiling sensors are converted to readable signals by the computer which are sent to the control and analysis computer to be manipulated as described hereafter.

Figure 9:
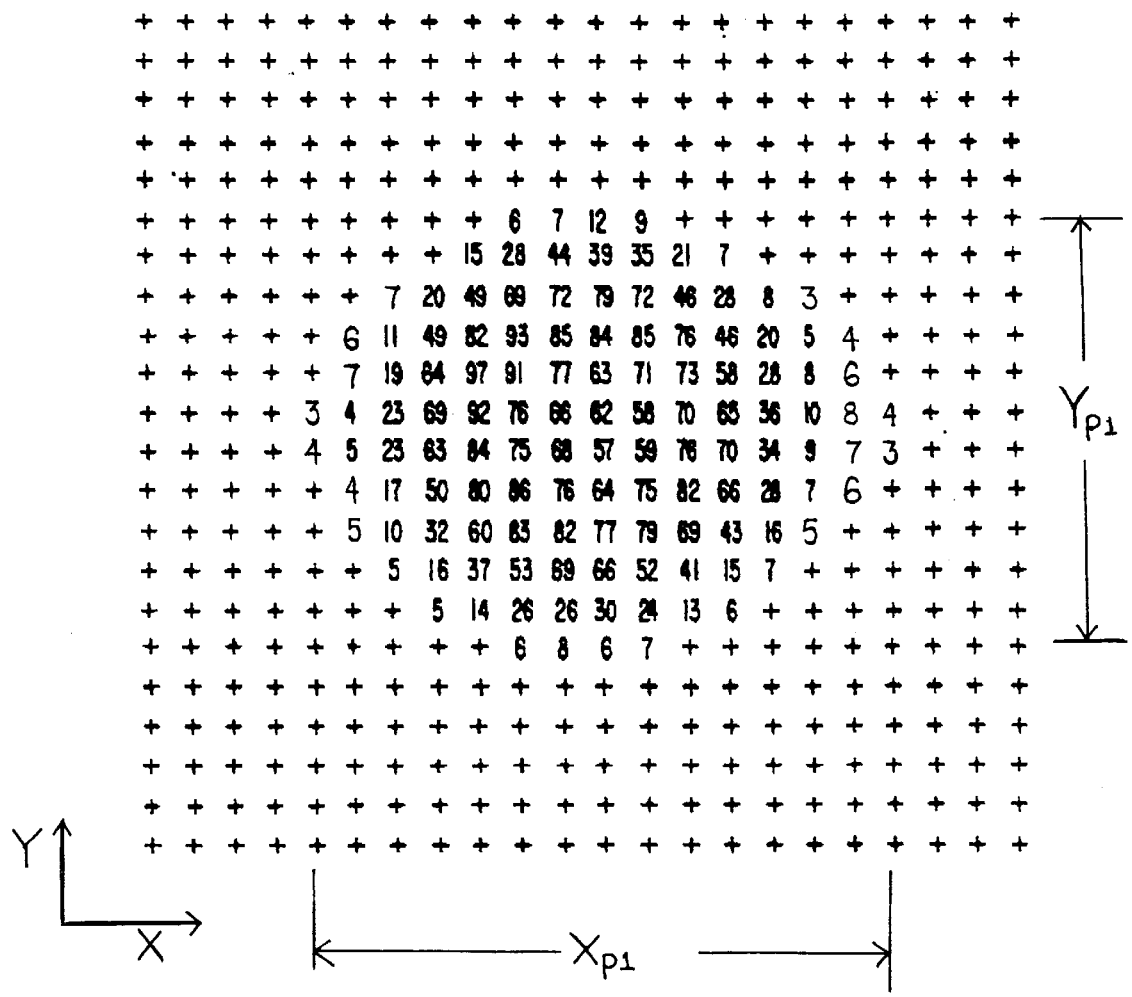
FIG. 9 is a chart showing a sample intensity profile for a beam generated by measurements taken in one plane according to the present invention.

In physical terms, the beam profiling method according to the present invention causes the beam to be moved to each of the points of an array on the pinhole plate centered on the best known position of the pinhole. As a result, different sectors of the beam will fall on the pinhole and will be transmitted through the same to be detected by the photodiode and converted into a numerical signal that can be analyzed by the computer. A profile of the intensity of different sectors of the beam will be built up by the computer as shown in FIG. 9. This is the "intensity profile" of the beam.

As disclosed in U.S. Pat. No. 5,267,013 to Spence, a beam profile is developed by calling up the best known location of a pinhole on the beam profiler sensor from memory by the control and analysis computer which then directs the scanning optics to direct the beam at the best known location. The control and analysis computer, through the beam scanning optics, moves the beam to the first row in the first column of a square array centered on the best known location. The profiling sensor behind the pinhole takes a measurement indicative of the intensity of the beam penetrating the pinhole, and the measurement value is saved in memory along with scanning mirror position coordinates associated with the measurement. The beam is then moved in sequence from the first to the last array points on a particular row or column and an intensity measurement value is taken and correspondingly saved with is the scanning mirror position coordinates. The steps are repeated until measurements for all of the coordinates of the beam profile are taken, establishing an array of intensity values.

Preferably, the control and analysis computer analyzes the array of intensity values and generates a new best known location of the pinhole for use in performing the first step of the scan profile the next time. The best known location held by the control and analysis computer is herein referred to as an optimized focal position. Typically, the best known position is updated by processing the beam profile readings, as discussed above, in order to calibrate the pointing of the beam by the scanning mirrors. This is needed in order to eliminate drifting that occurs in pointing the beam, which can be corrected by adjusting the scanning mirrors. However, according to the present invention, the optimized focal position preferably comprises an X-Y coordinate and a Z focus value in which all three values can be optimally adjusted by the system.

Figure 4:
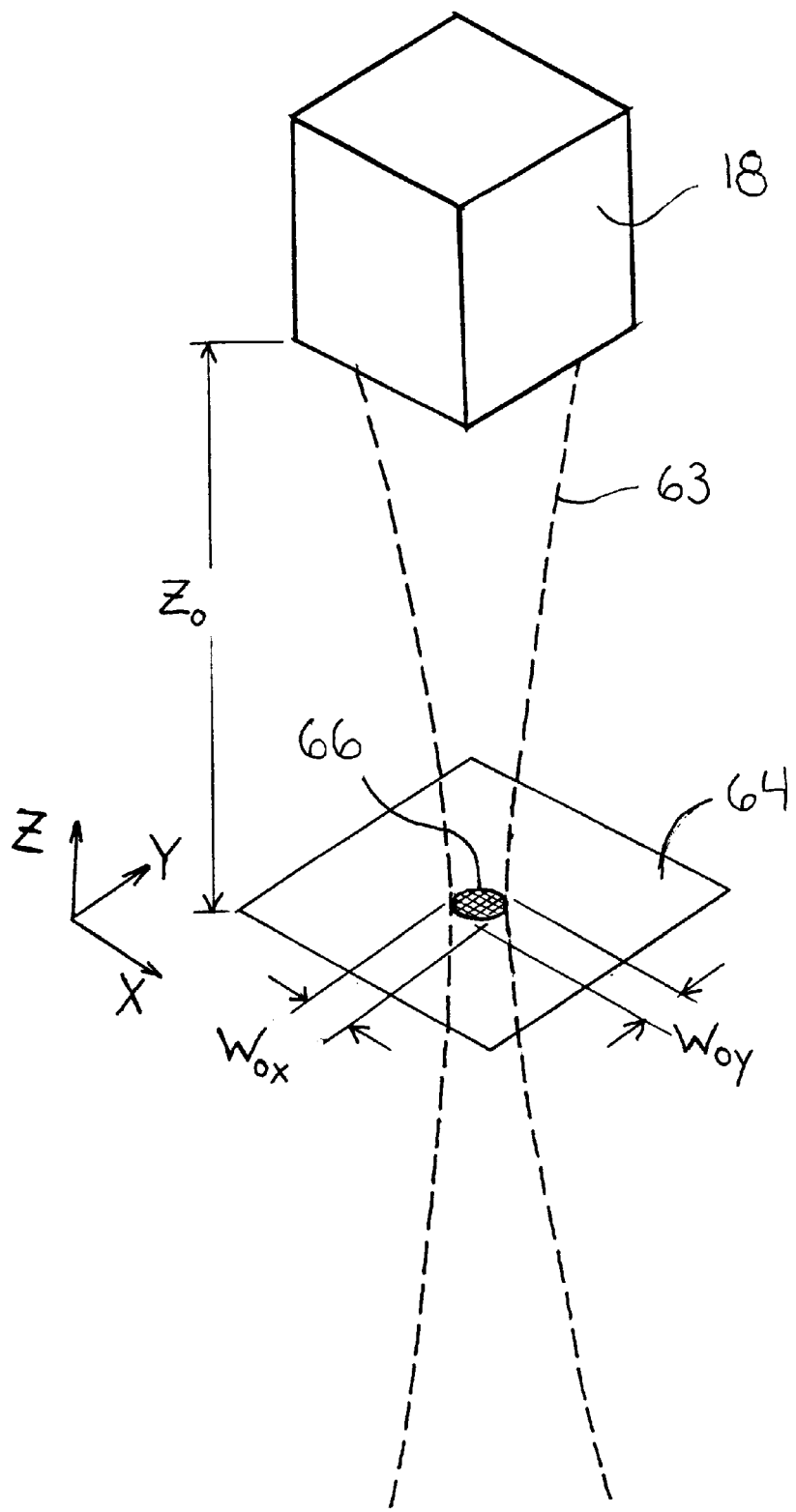
FIG. 4 is an isometric schematic view of a profile taken from a focused beam of energy.

Referring now to FIG. 4, for purposes of illustration, the propagation characteristics of a focused beam of energy 63 is shown intersecting a focal plane 64 and generating a profile 66. For an ideally focused beam, the beam waist 66 at the focal plane 64 will be a true circle. Hence, the minimum diameter measurements of the beam in the X and Y directions, shown by $W_{ox}$ and $W_{oy}$, will not only be identical for an ideal beam, but will reside in the same focal plane 64 positioned at a distance $Z_o$ from a reference position such as the light source 18. $Z_o$ is thus the distance between narrowest spot of the focused beam and a reference point measured along the propagation axis of the beam. For purposes of illustration, the reference point is conveniently shown in FIG. 1 at 46 which is the pivot point of the scanning optics 36 shown in FIGS. 2 and 3. It is this narrowest spot point that is the optimal focal position of the beam, which is desirably positioned to reside within a desired focal band of the apparatus.

However, most focused beams are rarely ideal, and typically have associated with them an asymmetrical condition.

Figure 5:
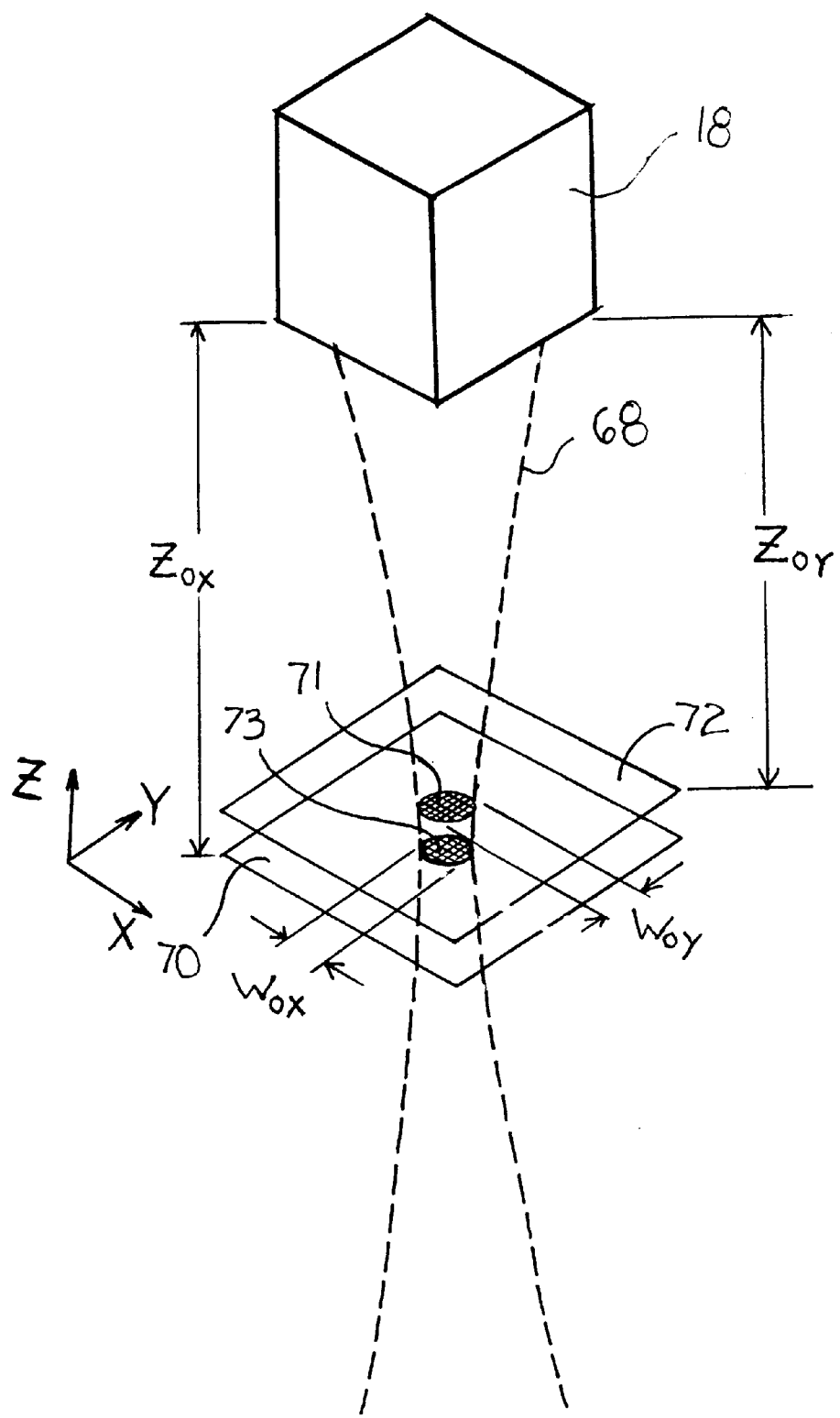
FIG. 5 is an isometric schematic view of a profile taken from a focused beam of energy having an astigmatic condition.

Referring now to FIG. 5, a focused beam is shown by the numeral 68 having a non-optimal condition commonly known as an astigmatic condition. For an astigmatic beam, there are two focal positions or planes, and the profile of the beam at the two different focal planes are not true circles. Most commonly the focal plane profiles, 71 and 73, are elliptical in shape and have a minor axis pointing in two different directions. The two different directions are normally perpendicular to one another. For instance, for the astigmatic beam shown in FIG. 5, the beam waist or minor axis diameter measured in the X-direction ($W_{ox}$) resides in profile 73 in focal plane 70, while the beam waist or minor axis diameter measured in the Y-direction ($W_{oy}$) resides in profile 71 in focal plane 72. The focus position for focal plane 70 is located at $Z_{ox}$, and the focus position for focal plane 72 is located at $Z_{oy}$. Undesirably, most astigmatic beams are never truly in focus because they have two focal planes separated from one another by an astigmatism value, the value being the difference between $Z_{ox}$, and $Z_{oy}$. Although astigmatic beams are to be avoided in SFF systems, however, all real focused beams will generally exhibit some form of an asymmetrical condition, and profiling techniques currently in use in SFF systems are unable to correct such conditions let alone detect such conditions without requiring laborious manual efforts.

Figure 10:
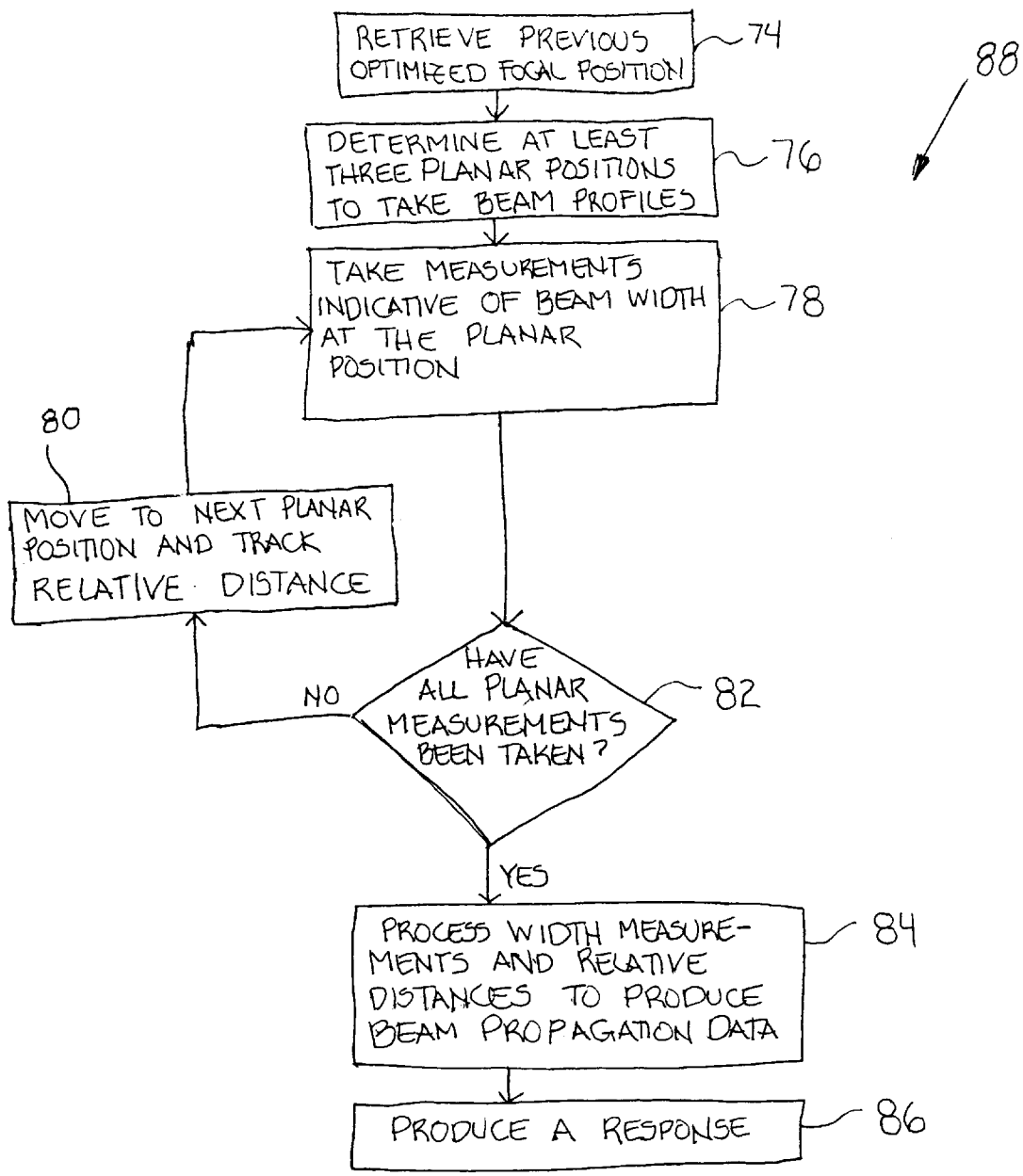
FIG. 10 is a flow chart of the method of measuring the propagation characteristics of a focused beam of energy.

Referring now to FIG. 10, the overall methodology of measuring the propagation characteristics of a focused beam of energy according to the present invention is generally indicated by the numeral 88. The first step identified by numeral 74 involves retrieving the previously stored optimized focal position from the computer controller associated with positioning the focused beam on the profiling stage. The second step indicated by numeral 76 involves selecting at least three separate planar positions to take beam profile measurements indicative of the beam width in each plane. Preferably this is accomplished by a simple algorithm that selects at least one planar location above and below the Z focus value of the optimized position with the Z focus value being the third planar position. Although measurements in at least three planes are required, there may be as many as 100 planes measured, or more, if desired.

The planar positions are ideally orthogonal to the propagation axis of the focused beam and are selected to provide measurements both above and below the theoretical focal position of the beam, which is typically associated with the Z focus value of the optimized focal position. The third step identified by the numeral 78 involves taking beam profile measurements indicative of the beam width in the particular planar location. An exemplary profile taken with a photodiode sensor in the profiling stage is shown in FIG. 9, wherein one measurement indicative of the beam width in the X-direction ($X_{p1}$) and one in the Y-direction ($Y_{p1}$) is shown. It is important to the present invention that when these measurements ($X_{p1}$ and $Y_{p1}$) are determined by the computer control system, that the computer control system keeps track of the relative distance between the planar positions. The relative distance between the planar positions may be tracked by associating each planar position with the actual distance ($Z_{p1}$) between the plane in which they are measured and the reference position (shown at 46 in FIG. 1), if desired. The value of the predetermined distance for a given plane is measured along the propagation axis of the beam between the reference position (see FIG. 1. at 46, and in FIG. 6. at $P_{ref}$) and the plane being measured. Preferably, the reference position is the point about which the scanning optics pivots the beam; however, any fixed position can be used, if desired.

However, it is preferred for the controller to simply track relative incremental quantized steps taken along the propagation axis when shifting the propagation characteristics of the beam with respect to the profiling stage, instead of measuring actual distances. This is because it is preferred to shift the propagation characteristics of the beam by sending incremental quantized signals from the controller to the focus control optics of the beam conditioning optics in order to shift the focal point of the beam in incremental steps along the propagation axis. It is important that the propagation characteristics of the beam are not substantially altered when the propagation characteristics are shifted along the propagation axis by the focus control optics.

The term "not substantially altered" refers to the fact that many optical elements do not allow entirely independent adjustments along the propagation axis of the beam. For example, a circular lens can be tilted to affect the optical power to a greatest extent along a plane through an X-axis. Such a tilting inevitably changes the lens's optical power along a plane through the Y-axis, but in practice to a smaller extent. As a practical matter, preferred beam conditioning systems provide one adjustment along an axis perpendicular to the propagation path to alter the ellipticity or astigmatism of the beam and another adjustment to alter the overall spot size or overall focus position. Because an adjustment along one axis generally alters another axis of the beam, it is typically necessary to perform iterations of the spot size and focus position adjustments to achieve a desired focus position and spot size, at least in initial set up. Thus, some slight alteration does actually occur when shifting the propagation characteristics of the beam along its propagation axis by utilizing the focus control optics. However, the amount of alteration is not substantial when the actual shift does not change the beam waist value of the optimized focal position of the beam by more than about 10 percent, and preferably by no more than about 5 percent. Hence, when a beam is shifted along its propagation axis, the propagation characteristics of the beam is "not substantially altered" when the beam waist value of the optimized focal position changes by no more than about 10 percent. It would be preferred that the beam waist value does not change at all when utilizing the focus optics to shift the beam, which can be accomplished by shifting the beam propagation characteristics without utilizing the focus control optics, such as by moving the profiling stage, if desired.

Assuming that not all of the measurements have been taken for the planar positions, as indicated by a "no" answer to the question identified by numeral 82, the fourth step identified by the numeral 80 involves moving to the next planar position and tracking the relative distance of the movement. The steps of taking profile measurements indicative of the beam width are again taken, as identified by numeral 78 (i.e. $X_{p2}$ and $Y_{p2}$). Shifting the propagation characteristics of the focused beam respectively with the profiling stage, as indicated by step 80, can be accomplished in a variety of ways. For example, the profiling stage can be moved physically up or down along the propagation axis, or the laser system 32 can be moved physically up or down, if desired. Preferably, the Z focus value position is incrementally adjusted by the focus control optics of the laser in preparation of taking measurements in the next planar position. In some SFF systems such as the SLA® 7000 system, the focus optics of the laser system can easily receive discrete quantized computer commands to precisely move the focus point of the beam without substantially altering the propagation characteristics of the beam, and is therefore the preferred method. Once all measurements have been taken, as indicated with a positive response to the question identified by the numeral 82, the measurements (i.e. $X_{p1}$, $Y_{p1}$, $X_{p2}$, $Y_{p2}$, $X_{p3}$, $Y_{p3}$, ... $X_{pi}$, $Y_{pi}$) and relative distances (i.e. $Z_{p1}$, $Z_{p2}$, $Z_{p3}$, ..., $Z_{pi}$) are then processed by the computer control system to produce beam-propagation data as identified by the numeral 84. The final step of producing a response is identified by the numeral 86, and generally all the embodiments of the present invention vary somewhat on the type of response that is generated.

One algorithm for measuring the beam propagation characteristics according to the present invention by utilizing existing components in a SLA® 7000 system has been proposed. Current SLA® 7000 systems have a moving lens that is imbedded inside the laser head whose focal position ($Z_o$ value) is adjustably controlled by the focus control optics which receives focus commands from the computer control system. Presently, the profiling stages in the SLA® 7000 systems are used to determine whether the mirrors need to be aligned, whether the laser should be serviced, whether the scanner mirrors have drifted, and whether the cure parameter values should be modified to achieve the desired solidification thickness and width. However, they presently are not used to determine the propagation characteristics of the focused beam. A new computer program can be implemented into the existing SLA® 7000 computer control system in order to enable the system to be able to measure the propagation characteristics of the focused beam. The program would need to execute the following steps:

(1) Retrieve parameter J1 from the laser power supply (the Z focus value of the optimized focal position);

(2) Assign X=J1−100

(3) Assign J4=X (4) Command the computer to move the lens of the focused beam to the J4 position;

(5) Perform a standard profiling routine that includes beam searching, centering, and eventually accumulating a prescribed number of profiles;

(6) Process the beam width in both the X and Y direction and track relative Z values associated with each profile;

(7) Assign new X value: X=J4+δ, where δ is a predetermined step size;

(8) Repeat steps (3) through (7) above until the final J4 position goes beyond J1+200 or reaches the end of the movable range of the focused beam;

(9) Process the measurements and generate beam propagation data;

(10) Display the beam propagation data in a graphic manner; and

(11) Determine a new J1 value based on an analysis of the beam propagation data.

Figure 6:
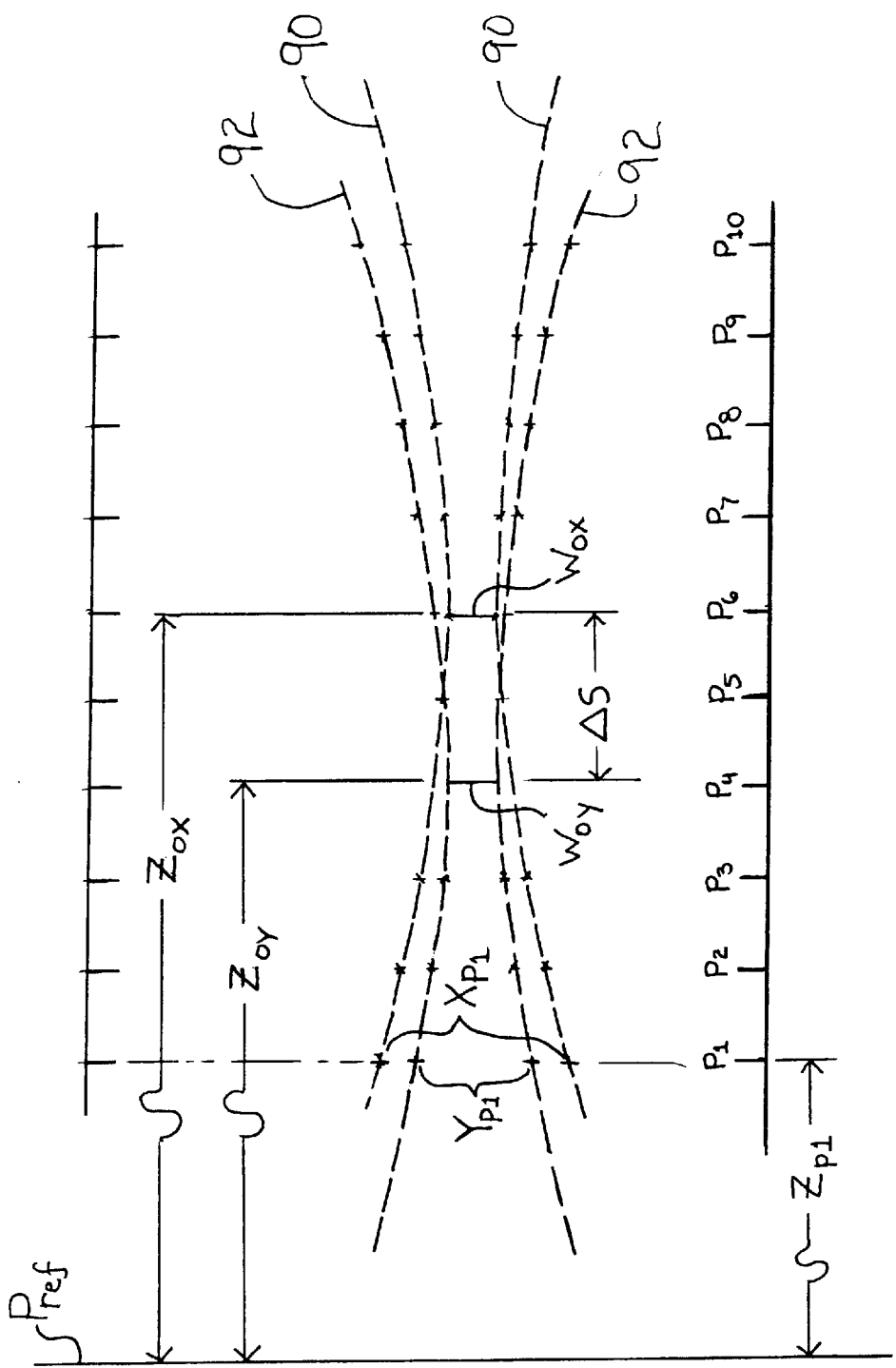
FIG. 6 is a graph of the propagation characteristics of the focused beam shown in FIG. 5.

Referring to FIG. 6, a graphic display response generated from the beam propagation data is shown for the astigmatic beam discussed in FIG. 5. For purposes of illustration, measurements were taken in ten separate orthogonal planes graphically displayed as vertical positions identified as $P_1$, $P_2$, $P_3$, ..., to $P_{10}$, respectively. Two separate beam propagation cross-sections are generated, one path identified by numeral 90 that is associated with the profile measurements taken in the X-direction, and one path identified by the numeral 92 that is associated with the profile measurements taken in the Y-direction. Although it is preferred they are superimposed when graphically displayed, the separate beam propagation cross-sections may be displayed separately, if desired. However, when the cross-sections are displayed as shown in FIG. 6, the astigmatic condition of the beam or "ΔS" value can clearly be seen. As used herein, the ΔS value is referred to as the astigmatism value and is a measurement indicative of the distance between the focal planes in which the first beam waist and second beam waist reside. This value is determined from beam waist measurements taken in two different directions along a focused beam. Preferably the two different directions are in the X-direction and the Y-direction; however, this may not always be the case depending on characteristics of the focused beam.

Although there are a variety of ways to analyze the beam propagation data to produce a response for a given SFF system, it is preferred that the data be analyzed to calculate beam propagation values in accord with the $M^2$ standard discussed previously. For instance, referring to FIG. 6, it is desirable to determine a first beam waist from the measurements taken in the first direction ($W_{ox}$), to determine a second beam waist from the measurements taken in the second direction ($W_{oy}$), to determine the first focal point value ($Z_{ox}$) between the first beam waist ($W_{ox}$) and the reference point ($P_{ref}$), to determine the second focal point value ($Z_{oy}$) between the second beam waist ($W_{oy}$) and the reference point ($P_{ref}$), and to determine the astigmatism value (ΔS) by comparing the first focal point value ($Z_{ox}$) and second focal point value ($Z_{oy}$). Further, it may be desirable to determine a first divergence angle $\Theta_x$ from the measurements taken in the first direction, to determine a second divergence angle $\Theta_y$ from the measurements taken in the second direction, to determine a first times-diffraction-limit number ($M_x^2$) from the measurements taken in the first direction, and to determine a second times-diffraction-limit number ($M_y^2$) from the measurements taken in the second direction. Any or all of these values can be calculated by the computer control system of any SFF apparatus and delivered as a response to a monitor or printing device that can graphically display the values, as desired. In addition, the data can be analyzed to detect any non-optimal condition found in the propagation characteristics of the beam, including, for instance, out-of-focus conditions, astigmatic conditions, asymmetric waist conditions, asymmetric divergence conditions, and the like.

In one embodiment, the response merely indicates when a non-optimal condition is detected in the beam. For many older SFF machines the focused beams are generally non-adjustable, and it may only be realistic to upgrade their computer controller systems to execute the steps disclosed herein to make the determination of whether the focused beam of energy is still functioning within an acceptable range. Many older SFF machines are well suited for such an upgrade, and this could be accomplished by deciding a range of acceptable values for a given SFF machine and inputting the range of values into the memory of the computer controller. For example, if the non-optimal condition is an astigmatic condition, the response may be determined by comparing the calculated astigmatism value (ΔS) to a range acceptable of astigmatism values provided in memory. If the calculated astigmatism value is outside the range, the calculated value can be delivered along with the beam propagation data, for example, to the display device as a message indicating to the operator that the laser needs to be repaired and/or replaced as a result of detecting an unacceptable astigmatism condition. Alternatively, if the calculated value is outside the range, the response could be delivered in audio form or could simply be delivered to a dedicated indicator light, or the like, if desired, to alert the operator of the non-optimal condition.

In another embodiment, a response is produced and delivered to the beam conditioning optics to move the focused beam with respect to the profiling stage to is achieve an optimized position for forming dimensional objects. As discussed previously, the SLA® 7000 system SFF apparatus is well suited for this embodiment, as the focal position ($Z_o$ value) inside the laser head is already adjustably controlled by the computer control system. Thus, incorporating the present invention method into a SLA® 7000 system will allow for the focused beam to be optimally adjusted for the first time by taking into account any non-optimal condition detected in the beam.

In the preferred embodiment, the response is produced and delivered to the beam conditioning optics of a laser whose propagation characteristics are completely adjustable in order to eliminate any asymmetric condition detected. One such laser is disclosed in, for example, U.S. patent application Ser. No. 09/791,346, filed Feb. 23, 2001, entitled "Electronic Spot Control." Such a laser has beam conditioning optics that is independently laterally adjustable in, for example, the X-direction and the Y-direction. Preferably, at least one response is produced by the computer controller of the present invention and delivered to the beam conditioning optics to correct an asymmetric condition such an astigmatic condition. Hence, in the preferred embodiment, the present invention calibrates the focused beam of energy by measuring the propagation characteristics of the beam and produces the appropriate feedback responses necessary to eliminate any non-optimal condition detected in the beam. It is also envisioned that as processing speeds of digital signal processing chips available continue to increase, real-time adjustment of the focused beam will be possible such that the optimal focus position of the beam can be maintained on the working surface when scanning the beam to form three-dimensional objects.

Uniquely, the present invention can be used to eliminate asymmetric conditions and other non-optimal conditions in SFF machines without requiring additional components and systems to be included with the machines. In addition, the present invention eliminates the need to require field service personnel to carry special beam diagnostic equipment when servicing poorly operating machines that may have an undetected asymmetric condition in the beam.

What has been described are preferred embodiments for use in stereolithography machines in which modifications and changes may be made without departing from the spirit and scope of the accompanying claims. Further the methods taught herein can readily be used in any SFF machine utilizing a focused beam of energy.

What is claimed is:

1. A method of measuring the propagation characteristics of a focused beam of energy along a propagation axis in a solid freeform fabrication apparatus, the propagation characteristics established by beam conditioning optics, the method comprising:

directing the focused beam of energy to a profiling stage on the apparatus, the profiling stage receiving the focused beam of energy having substantially the same propagation characteristics used by the apparatus when forming a three-dimensional object;

taking a first set of at least two measurements indicative of a beam width of the focused beam of energy at the profiling stage, the first set of measurements associated with a first planar position orthogonal to the propagation axis of the focused beam of energy;

shifting the propagation characteristics of the focused beam of energy respectively with the profiling stage along the propagation axis of the focused beam by a first relative distance;

taking a second set of at least two measurements indicative of the beam width of the focused beam of energy at the profiling stage, the second set of measurements associated with a second planar position orthogonal to the propagation axis of the focused beam of energy;

shifting the propagation characteristics of the focused beam of energy respectively with the profiling stage along the propagation axis of the focused beam by a second relative distance;

taking a third set of at least two measurements indicative of the beam width of the focused beam of energy at the profiling stage, the third set of measurements associated with a third planar position orthogonal to the propagation axis of the focused beam of energy;

producing beam propagation data from the sets of measurements taken in each of the planar positions and the first and second relative distances;

analyzing the beam propagation data to detect a non-optimal condition of the beam; and producing at least one response when a non-optimal condition is detected.

2. The method of claim 1 wherein the step of taking the first set, the second set, and the third set of measurements further comprises:

providing at least one sensor at the profiling stage;

moving the focused beam of energy across the sensor to obtain a plurality of intensity readings indicative of a profile of the focused beam of energy, the plurality of intensity readings being taken for each planar position; and analyzing the plurality of intensity readings to determine the measurements indicative of the beam width for each planar position.

3. The method of claim 2 wherein the step of shifting the propagation characteristics of the focused beam of energy respectively with the profiling stage is accomplished by moving the profiling stage in a direction along the propagation axis while the propagation characteristics of the focused beam of energy remains stationary.

4. The method of claim 2 wherein the step of shifting the propagation characteristics of the focused beam of energy respectively with the profiling stage is accomplished by moving the propagation characteristics of the focused beam of energy in a direction along the propagation axis while the profiling stage remains stationary.

5. The method of claim 4 wherein the propagation characteristics of the focused beam of energy is respectively shifted along the propagation axis of the beam by adjusting the beam conditioning optics without substantially altering the propagation characteristics of the beam.

6. The method of claim 4 wherein the propagation characteristics of the focused beam of energy is respectively shifted along the propagation axis of the beam by moving the focused beam of energy in the apparatus without adjusting the beam conditioning optics.

7. The method of claim 1 wherein the non-optimal condition detected is an out-of-focus condition, an astigmatic condition, an asymmetrical waist condition, an asymmetrical divergence condition, or combination thereof.

8. The method of claim 7 wherein the first, the second, and the third sets of at least two measurements are taken with one measurement being taken in a first direction and the other measurement being taken in a second direction, the first and second directions for each planar position being mutually perpendicular and symmetrically oriented about the propagation axis of the focused beam of energy.

9. The method of claim 8 wherein the step of analyzing the beam propagation data comprises:

(a) determining a first beam waist from the measurements taken in the first direction;

(b) determining a second beam waist from the measurements taken in the second direction;

(c) determining a first focal point value between the first beam waist on the propagation axis and a reference point on the beam propagation axis;

(d) determining a second focal point value between the second beam waist on the propagation axis and the reference point; and (e) determining an astigmatism value by comparing the first focal point value and the second focal point value.

10. The method of claim 9 wherein the response is determined by comparing the astigmatism value to a range of astigmatism values acceptable for the solid freeform fabrication apparatus.

11. The method of claim 9 wherein the response is determined by processing any combination of the astigmatism value, the first beam waist, and the second beam waist.

12. The method of claim 9 wherein the step of analyzing the beam propagation data further comprises:

(a) determining a first divergence angle from the measurements taken in the first direction;

(b) determining a second divergence angle from the measurements taken in the second direction;

(c) determining a first times-diffraction-limit number from the measurements taken in the first direction;

(d) determining a second times-diffraction-limit number from the measurements taken in the second direction; and (e) wherein the response is determined by processing any combination of the astigmatism value, the first beam waist, the second beam waist, the first divergence angle, the second divergence angle, the first times-diffraction-limit number, and the second times-diffraction-limit number.

13. The method of claim 1 wherein the beam propagation data is delivered to a display device of the solid freeform fabrication device to produce a graphic display of the propagation characteristics of the beam.

14. The method of claim 1 wherein the response is delivered to the beam conditioning optics to adjust the beam conditioning optics to achieve an optimized position for the focused beam of energy for the apparatus.

15. A method of calibrating a focused beam of energy in a solid freeform fabrication apparatus by detecting and eliminating a non-optimal condition present in propagation characteristics of the focused beam, the propagation characteristics established by beam conditioning optics, the method comprising:

directing the focused beam of energy to a profiling stage on the apparatus, the profiling stage receiving the focused beam of energy having substantially the same propagation characteristics used by the apparatus when forming a three-dimensional object;

taking a first set of at least two measurements indicative of a beam width of the focused beam of energy at the profiling stage, the first set of measurements associated with a first planar position orthogonal to a propagation axis of the focused beam of energy;

shifting the propagation characteristics of the focused beam of energy respectively with the profiling stage along the propagation axis of the focused beam by a first relative distance;

taking a second set of at least two measurements indicative of the beam width of the focused beam of energy at the profiling stage, the second set of measurements associated with a second planar position orthogonal to the propagation axis of the focused beam of energy;

shifting the propagation characteristics of the focused beam of energy respectively with the profiling stage along the propagation axis of the focused beam by a second relative distance;

taking a third set of at least two measurements indicative of the beam width of the focused beam of energy at the profiling stage, the third set of measurements associated with a third planar position orthogonal to the propagation axis of the focused beam of energy;

producing beam propagation data from the sets of measurements taken in each of the planar positions and the first and second relative distances;

analyzing the beam propagation data to detect a non-optimal condition of the beam;

producing at least one response when a non-optimal condition is detected;

delivering the response to the beam conditioning optics; and adjusting the beam conditioning optics upon the delivery of the response to substantially eliminate the non-optimal condition.

16. The method of claim 15 wherein the step of taking the first set, the second set, and the third set of measurements further comprises:

providing at least one sensor at the profiling stage;

moving the focused beam of energy across the sensor to obtain a plurality of intensity readings indicative of a profile of the focused beam of energy, the plurality of intensity readings being taken for each planar position; and analyzing the plurality of intensity readings to determine the measurements indicative of the beam width for each planar position.

17. The method of claim 16 wherein the step of shifting the propagation characteristics of the focused beam of energy respectively with the profiling stage is accomplished by moving the profiling stage in a direction along the propagation axis while the propagation characteristics of the focused beam of energy remains stationary.

18. The method of claim 16 wherein the step of shifting the propagation characteristics of the focused beam of energy respectively with the profiling stage is accomplished by moving the propagation characteristics of the focused beam of energy in a direction along the propagation axis while the profiling stage remains stationary.

19. The method of claim 18 wherein the propagation characteristics of the focused beam of energy are respectively shifted along the propagation axis of the beam by adjusting the beam conditioning optics without substantially altering the propagation characteristics of the beam.

20. The method of claim 18 wherein the propagation characteristics of the focused beam of energy are respectively shifted along the propagation axis of the beam by moving the focused beam of energy in the apparatus without adjusting the beam conditioning optics.

21. The method of claim 15 wherein the non-optimal condition detected is an out-of-focus condition, an astigmatic condition, an asymmetrical waist condition, an asymmetrical divergence condition, or combination thereof.

22. The method of claim 21 wherein the first, the second, and the third sets of at least two measurements are taken with one measurement being taken in a first direction and the other measurement being taken in a second direction, the first and second directions for each planar position being mutually perpendicular and symmetrically oriented about the propagation axis of the focused beam of energy.

23. The method of claim 22 wherein the step of analyzing the beam propagation data comprises:

(a) determining a first beam waist from the measurements taken in the first direction;

(b) determining a second beam waist from the measurements taken in the second direction;

(c) determining a first focal point value between the first beam waist on the propagation axis and a reference point on the beam propagation axis;

(d) determining a second focal point value between the second beam waist on the propagation axis and the reference point; and (e) determining an astigmatism value by comparing the first focal point value and the second focal point value.

24. The method of claim 23 wherein the step of analyzing the beam propagation data further comprises:

(a) determining a first divergence angle from the measurements taken in the first direction;

(b) determining a second divergence angle from the measurements taken in the second direction;

(c) determining a first times-diffraction-limit number from the measurements taken in the first direction; and (d) determining a second times-diffraction-limit number from the measurements taken in the second direction.

25. The method of claim 24 wherein the response is determined by processing any combination of the measurements taken in the first direction, the measurements taken in the second direction, a ratio between the first and second relative distances, the first focal point value, the second focal point value, the astigmatism value, the first beam waist, the second beam waist, the first divergence angle, the second divergence angle, the first times-diffraction-limit number, and the second times-diffraction-limit number.

26. The method of claim 15 wherein the beam propagation data is delivered to a display device of the solid freeform fabrication device to produce a graphic display of the propagation characteristics of the beam.

27. A solid freeform fabrication apparatus adapted to measure the propagation characteristics of a focused beam of energy utilized by the apparatus when forming three-dimensional objects from a build material, the apparatus comprising:

an apparatus structure;

a platform in communication with the apparatus structure for supporting the build material of the three-dimensional object when the three-dimensional object is formed by the apparatus;

a laser beam generator in communication with the apparatus structure for producing the energy that is transmitted in the focused beam of energy;

beam conditioning optics in communication with the apparatus structure, the beam conditioning optics receiving the energy transmitted from the laser beam generator and projecting the focused beam of energy about a propagation axis;

scanning optics in communication with the apparatus structure receiving the focused beam of energy and directing the focused beam of energy towards the platform;

a profiling stage in communication with the apparatus structure and adapted for receiving the focused beam of energy from the scanning optics;

at least one sensor in communication with the profiling stage to take at least two measurements indicative of the beam width of the focused beam of energy at the profiling stage;

a controller in communication with at least the beam conditioning optics, the scanning optics, the sensor, the platform; and wherein the controller
  (a) produces beam propagation data from sets of at least two measurements indicative of the beam width, the first set taken in a first planar position, the second set taken in a second planar position, and the third set taken in a third planar position;
  (b) analyzes the beam propagation data to detect a non-optimal condition of the focused beam; and
  (c) produces at least one response when the non-optimal condition of the focused beam is detected.

28. The apparatus of claim 27 wherein the sensor obtains a plurality of intensity readings indicative of a profile of the focused beam of energy at each planar position; and
the controller analyzes the plurality of intensity readings taken at each planar position to determine the at least two measurements indicative of the beam width for that planar position.

29. The apparatus of claim 28 wherein in order to take the plurality of intensity readings for each planar position, the profiling stage is moved in a direction along the propagation axis while the propagation characteristics of the focused beam of energy remains stationary.

30. The apparatus of claim 28 wherein in order to take the plurality of intensity readings for each planar position, the propagation characteristics of the focused beam of energy is moved in a direction along the propagation axis while the profiling stage remains stationary.

31. The apparatus of claim 30 wherein in order to take the plurality of intensity readings for each planar position, the propagation characteristics of the focused beam of energy is respectively shifted along the propagation axis of the beam by adjusting the beam conditioning optics without substantially altering the propagation characteristics of the beam.

32. The apparatus of claim 30 wherein in order to take the plurality of intensity readings for each planar position, the propagation characteristics of the focused beam of energy is respectively shifted along the propagation axis of the beam by moving the focused beam of energy in the apparatus structure without adjusting the beam conditioning optics.

33. The apparatus of claim 15 wherein the non-optimal condition detected is an out-of-focus condition, an astigmatic condition, an asymmetrical waist condition, an asymmetrical divergence condition, or combination thereof.

34. The apparatus of claim 33 wherein the first, the second, and the third sets of at least two measurements are taken with one measurement being taken in a first direction and the other measurement being taken in a second direction, the first and second directions for each planar position being mutually perpendicular and symmetrically oriented about the propagation axis of the focused beam of energy.

35. The apparatus of claim 34 wherein the controller analyzes the beam propagation data and determines:
  (a) a first beam waist from the measurements taken in the first direction;
  (b) a second beam waist from the measurements taken in the second direction;
  (c) a first focal point value between the first beam waist on the propagation axis and a reference point on the beam propagation axis;
  (d) a second focal point value between the second beam waist on the propagation axis and the reference point; and
  (e) an astigmatism value by comparing the first focal point value and the second focal point value.

36. The apparatus of claim 34 wherein the response produced by the controller is determined by comparing the astigmatism value to a range of astigmatism values acceptable for the solid freeform fabrication apparatus.

37. The apparatus of claim 34 wherein the response produced by the controller is determined by processing any combination of the astigmatism value, the first beam waist, and the second beam waist.

38. The apparatus of claim 34 wherein the controller analyzes the beam propagation data and determines:
  (a) a first divergence angle from the measurements taken in the first direction;
  (b) a second divergence angle from the measurements taken in the second direction;
  (c) a first times-diffraction-limit number from the measurements taken in the first direction;
  (d) a second times-diffraction-limit number from the measurements taken in the second direction; and
  (e) the response from any combination of the astigmatism value, the first beam waist, the second beam waist, the first divergence angle, the second divergence angle, the first times-diffraction-limit number, and the second times-diffraction-limit number.

39. The apparatus of claim 27 further comprising:
a display device wherein the controller delivers the beam propagation data to the display device to produce a graphic display of the propagation characteristics of the beam.

40. The method of claim 27 wherein the controller delivers the response to the beam conditioning optics to adjust the beam conditioning optics to achieve an optimized position for the focused beam of energy for the apparatus.

41. A solid freeform fabrication apparatus adapted to calibrate a focused beam of energy utilized by the apparatus when forming three-dimensional objects from a build material, the apparatus comprising:
an apparatus structure;
a platform in communication with the apparatus structure for supporting the build material of the threedimensional object when the three-dimensional object is formed by the apparatus;
a laser beam generator in communication with the apparatus structure for producing the energy that is transmitted in the focused beam of energy;
beam conditioning optics in communication with the apparatus structure, the beam conditioning optics receiving the energy transmitted from the laser beam generator and projecting the focused beam of energy about a propagation axis;
scanning optics in communication with the apparatus structure receiving the focused beam of energy and directing the focused beam of energy towards the platform;
a profiling stage in communication with the apparatus structure and adapted for receiving the focused beam of energy from the scanning optics;
at least one sensor in communication with the profiling stage to take at least two measurements indicative of the beam width of the focused beam of energy at the profiling stage;

a controller in communication with at least the beam conditioning optics, the scanning optics, the sensor, the platform; and wherein the controller
- (a) produces beam propagation data from sets of at least two measurements indicative of the beam width, the first set taken in a first planar position, the second set taken in a second planar position, and the third set taken in a third planar position;
- (b) analyzes the beam propagation data to detect a non-optimal condition of the focused beam; and
- (c) produces at least one response when the non-optimal condition of the focused beam is detected and delivers the response to the beam conditioning optics to substantially eliminate the non-optimal condition.

42. The apparatus of claim 41 wherein the sensor obtains a plurality of intensity readings indicative of a profile of the focused beam of energy at each planar position; and the controller analyzes the plurality of intensity readings taken at each planar position to determine the at least two measurements indicative of the beam width for that planar position.

43. The apparatus of claim 42 wherein in order to take the plurality of intensity readings for each planar position, the profiling stage is moved in a direction along the propagation axis while the propagation characteristics of the focused beam of energy remains stationary.

44. The apparatus of claim 42 wherein in order to take the plurality of intensity readings for each planar position, the propagation characteristics of the focused beam of energy is moved in a direction along the propagation axis while the profiling stage remains stationary.

45. The apparatus of claim 44 wherein in order to take the plurality of intensity readings for each planar position, the propagation characteristics of the focused beam of energy is respectively shifted along the propagation axis of the beam by adjusting the beam conditioning optics without substantially altering the propagation characteristics of the beam.

46. The apparatus of claim 44 wherein in order to take the plurality of intensity readings for each planar position, the propagation characteristics of the focused beam of energy is respectively shifted along the propagation axis of the beam by moving the focused beam of energy in the apparatus structure without adjusting the beam conditioning optics.

47. The apparatus of claim 41 wherein the non-optimal condition detected is an out-of-focus condition, an astigmatic condition, an asymmetrical waist condition, an asymmetrical divergence condition, or combination thereof.

48. The apparatus of claim 47 wherein the first, the second, and the third sets of at least two measurements are taken with one measurement being taken in a first direction and the other measurement being taken in a second direction, the first and second directions for each planar position being mutually perpendicular and symmetrically oriented about the propagation axis of the focused beam of energy.

49. The apparatus of claim 48 wherein the controller analyzes the beam propagation data and determines:
- (a) a first beam waist from the measurements taken in the first direction;
- (b) a second beam waist from the measurements taken in the second direction;
- (c) a first focal point value between the first beam waist on the propagation axis and a reference point on the beam propagation axis;
- (d) a second focal point value between the second beam waist on the propagation axis and the reference point; and
- (e) an astigmatism value by comparing the first focal point value and the second focal point value.

50. The apparatus of claim 49 wherein the controller further analyzes the beam propagation data and determines:
- (a) a first divergence angle from the measurements taken in the first direction;
- (b) a second divergence angle from the measurements taken in the second direction;
- (c) a first times-diffraction-limit number from the measurements taken in the first direction; and
- (d) a second times-diffraction-limit number from the measurements taken in the second direction.

51. The apparatus of claim 50 wherein the controller calculates the response by processing any combination of the measurements taken in the first direction, the measurements taken in the second direction, a ratio between the first and second relative distances, the first focal point value, the second focal point value, the astigmatism value, the first beam waist, the second beam waist, the first divergence angle, the second divergence angle, the first times-diffraction-limit number, and the second times-diffraction-limit number.

52. The apparatus of claim 41 further comprising:

a display device wherein the controller delivers the beam propagation data to the display device to produce a graphic display of the propagation characteristics of the beam.

53. The apparatus of claim 41 wherein the controller delivers the response to the beam conditioning optics to adjust the beam conditioning optics to achieve an optimized position for the focused beam of energy for the apparatus.

* * * * *